United States Patent [19]

Sugalski

[11] 4,186,246

[45] Jan. 29, 1980

[54] HERMETICALLY SEALED ELECTROCHEMICAL STORAGE CELL

[75] Inventor: Raymond K. Sugalski, Gainesville, Fla.

[73] Assignee: General Electric Company, Gainesville, Fla.

[21] Appl. No.: 932,922

[22] Filed: Aug. 11, 1978

[51] Int. Cl.² .................................................. H01M 2/30
[52] U.S. Cl. ...................................... 429/60; 429/181; 29/623.2
[58] Field of Search ................... 429/57, 58, 59, 60, 429/94, 174, 178, 181, 185, 163, 164

[56] References Cited

U.S. PATENT DOCUMENTS

| | | |
|---|---|---|
| 2,428,850 | 10/1947 | Lawson .................................. 429/94 |
| 2,928,889 | 3/1960 | Bonner et al. . |
| 3,174,878 | 3/1965 | Peters . |
| 3,379,570 | 4/1968 | Berger et al. . |
| 3,503,806 | 3/1970 | Sugalski . |
| 3,579,387 | 5/1971 | Voyentzie et al. . |
| 3,607,405 | 9/1971 | Christopher . |
| 3,703,415 | 11/1972 | Mitoff et al. . |
| 3,762,955 | 10/1973 | Dubin . |
| 3,790,408 | 2/1974 | Cromer . |
| 3,826,684 | 7/1974 | Pensabene . |
| 3,836,798 | 9/1974 | Greatbatch . |
| 3,867,950 | 2/1975 | Fischell . |
| 3,888,260 | 6/1975 | Fischell . |
| 3,942,535 | 3/1976 | Schulman . |

FOREIGN PATENT DOCUMENTS 1274882  5/1972  United Kingdom .

*Primary Examiner*—Donald L. Walton
*Attorney, Agent, or Firm*—Morgan, Finnegan, Pine, Foley & Lee

[57] ABSTRACT

A sealed, rechargeable electrochemical cell in which a hermetically sealed glass casing completely surrounds an electrode assembly comprised of anode and cathode electrodes containing electrochemically active material, and a porous electrolyte absorbent separator between and in contact with each of the electrodes, the electrolyte absorbed in the separator being present in an amount not exceeding the separator capacity, the seal being effected at terminal conductors extending through the casing wall from the electrodes at the interior of the cell.

15 Claims, 9 Drawing Figures

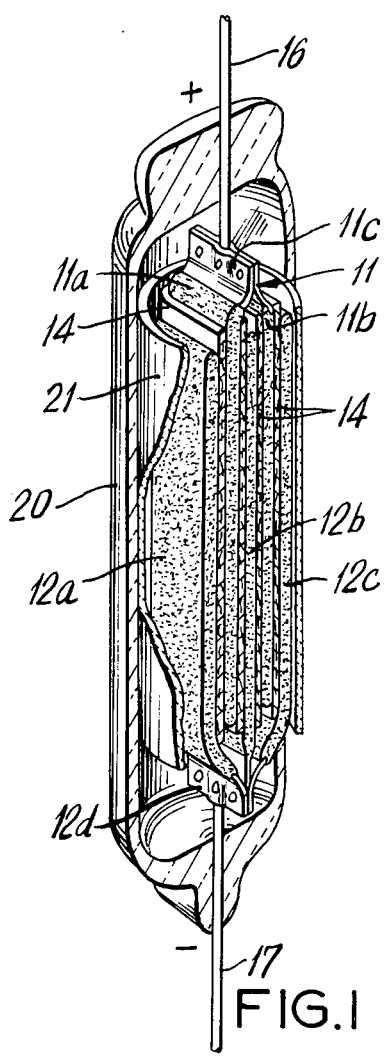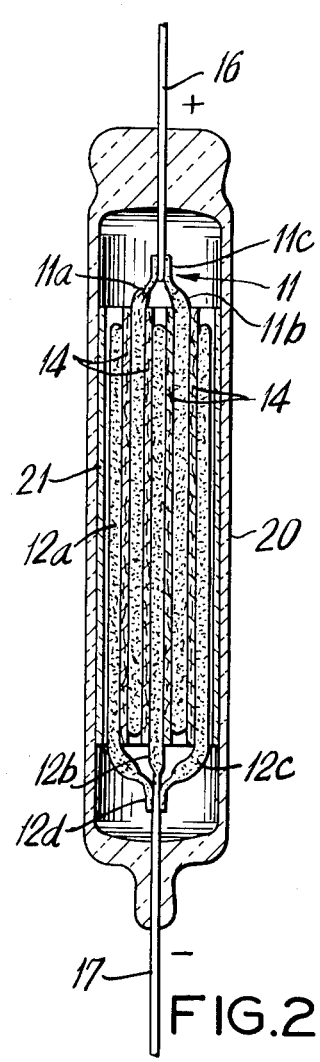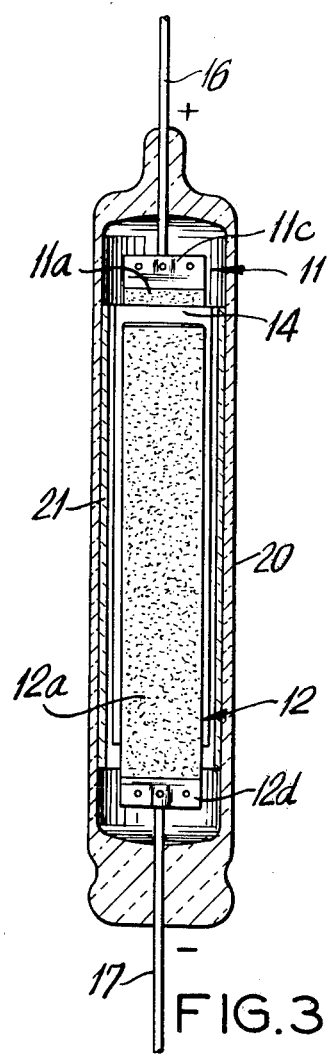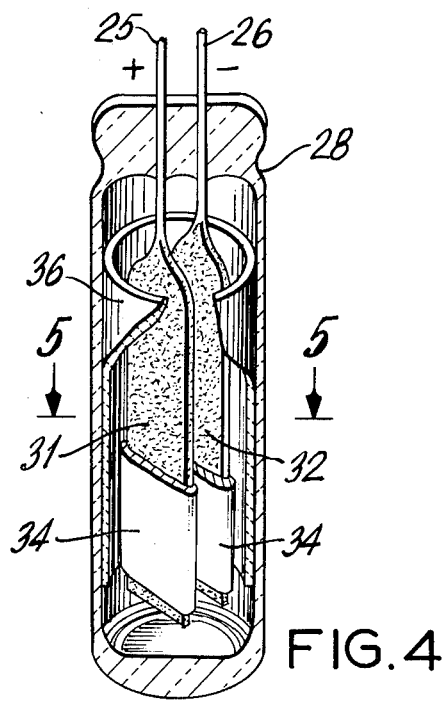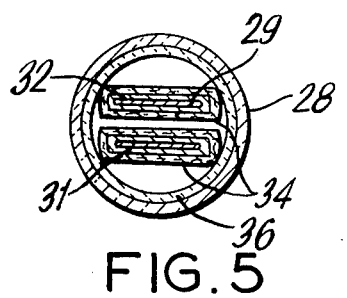

HERMETICALLY SEALED ELECTROCHEMICAL STORAGE CELL

BACKGROUND OF THE INVENTION

This invention relates to sealed electrochemical storage cells, or batteries, and in particular to an electrochemical cell in which the elements are hermetically sealed within and mechanically supported by a glass casing.

Hermetically sealed or permanently fluid tight galvanic cells of the rechargeable type are in wide use. These cells have found wide application and, since they are intended to have an indefinite lifetime encompassing almost unlimited recharging capabilities (rechargeable nickel/cadmium batteries can meet original specifications after hundreds of charge-discharge cycles), much attention has been devoted to the construction of these cells, particularly with a view to preventing loss of electrolyte. This loss of electrolyte is one of the most important factors of cell longevity and is a direct function of the effectiveness of the seal between parts of the cell casing.

Most galvanic cells of the rechargeable type in commercial use today are constructed of steel casings consisting of a can-shaped main part and a top closure. Sealing of the joint between the main housing and the top has been the subject of considerable development work in the art. Two rechargeable cell constructions of the type in widespread commercial use at the present time may be found in U.S. Pat. Nos. 3,503,806, 3,579,387 and 3,826,684, all assigned to the assignee of the present invention. A number of variations of this basic type of construction are also practiced. What all these constructions have in common, however, is the necessity for sealing the joints between the parts of the casing and, in certain cases, between the external terminal connections and the interior of the cell. In addition to the problem of hermetically sealing the cell, connections must be made between one of the cell electrodes, either the positive or negative electrode, and the top closure member. This means that separate welding steps or other attachment procedures must be included as part of the assembly process. Other cell constructions using plastic or epoxy casings have not proved out, owing to the difficulty of sealing the terminal connections with the casing should thermal expansion and contraction of the casing relative to the terminal conductors occur.

More recently, rechargeable galvanic cells have found acceptance in the medical electronic field: in a familiar use, a cell is implanted in the patient where it powers a cardiac pacer, for example. This has presented yet further complications of cell construction, since the cell must be not only impervious to the passage of gases, but must be constructed of a material compatible with the patient's immunological system and chemically non-reactive with body fluids. Where electrochemical cells have been adapted to implantation, the approach has been to encapsulate the cell (together with other electronic elements) in a silicon based material, such as a Silastic compound. Some examples of this approach are to be found in U.S. Pat. No. 3,888,260 and U.K. Pat. No. 1,274,882. In any event, the development of this technology has not evolved any different types of electrochemical cell construction; it has, rather, simply complicated the environment of cell operation.

Glass encased cells have been proposed in the past, but these cells are not of the galvanic rechargeable, or storage, type wherein the electrochemical reactions are reversible. Moreover, because these cells operate on different principles, or because they embody different electrochemical reactions, they have inherent disadvantages which cannot easily be overcome and do not lend themselves to mass production. One such glass encased cell, for example, is described in U.S. Pat. No. 3,836,798 wherein a nuclear energy source (lithium) in slab form is coated with a radioactive nuclide (lithium hydride) coating and surrounded with p-type and n-type silicon base material for converting the radioactive radiation into a potential difference. The cell electrodes are connected to the respective p-type and n-type materials. The foregoing elements are sheathed in a $SiO_2$ glass selected to pass helium but contain hydrogen. The problem here, of course, is the radioactivity of the source and the necessity for venting evolved gas during operation.

Another example of the complex nature of known glass encased cells is to be found in U.S. Pat. Nos. 3,607,405 and 3,762,955. These patents disclose sodium-containing batteries wherein a halogen-in-conductive-material anode mass is sealed between an outer glass envelope and an ionic conducting container of, for example, sodium beta alumina filled with sodium or a sodium amalgam as the cathode material. Terminal conductors extend from the anode and cathode masses to the opposite ends of the exterior of the cell and are sealed to the glass envelope. Cells of this type require that the ionic conduction container, or vessel, be suspended inside the glass envelope and sealed to it at the open end of the container by melting of a glass washer in order to form a closed cavity between these two elements. The cavity is subsequently filled with anode material through an opening in the glass envelope; next the opening is closed by melting the glass about the anode conductor.

It is the specific object of my invention to provide a new galvanic construction and method of making the cell wherein the cell may be manufactured rapidly, with a minimum number of parts and hermetically sealed against the transfer of gases without the need for separate sealing gaskets and similar such components.

A further object of the invention is to provide a versatile small-sized electrochemical storage cell which has promising applicability to the field of medical electronics and other special uses.

Another object of the invention is to provide a storage cell construction, wherein the electrode structure may be assembled outside of the battery casing, and inserted in assembled form into the casing, and the casing sealed directly to the terminal conductors for the cell.

SUMMARY OF THE INVENTION

I have found that it is possible to manufacture an electrochemical storage cell wherein the anode and cathode of the cell, together with an absorbent separator disposed between and in contact with each of the electrodes, are contained within a glass enclosure surrounding the electrodes and separator and hermetically sealing the cell. Battery terminal conductors electrically connected to the anode and cathode electrodes are brought out of the cell through the glass casing to provide directly an effective seal between the cell terminal conductors and the casing.

While the cell electrodes can be of conventional construction, as where flat anode and cathode plates interleaved with separators are wound into a spiral, the special electrode constructions disclosed herein employ a plurality of flat, interleaved plates to which terminal conductors are connected at the respective ends. Other electrode forms, such as plaques coated directly onto the terminal conductors are also disclosed. The particular form and size of electrode employed depends upon the desired capacity and other electrical characteristics of the cell.

In accordance with the invention, the separator carries an absorbed quantity of electrolyte, substantially to preclude the presence of free electrolyte within the glass enclosure. When the quantity of electrolyte is so restricted, the possibility of liquid condensed electrolyte collecting on or making direct contact with the glass wall of the cell is minimized. This is desirable, inasmuch as caustic and acid electrolytes tend to etch or otherwise degrade the glass over extended periods of time.

The present invention differs from the previously discussed technology in providing a cell and manufacturing method which permits for pre-assembly of electrodes and insertion into a simple glass casing. Furthermore, the invention provides a storage cell, as distinguished from primary cells, and avoids the substantial complications of cells described in the above prior art patents.

In the preferred method of manufacturing the cell in accordance with the invention, open glass enclosures—for example, individual pieces of glass tubing—are cut to desired length and arranged to receive assembled electrode structures during assembly on a production line basis. The electrodes are slipped into the tubing and held in the desired position axially of the tube while one or both ends of the tube are sealed. Sealing may be carried out in any conventional manner as by heating the glass tube ends, or by local radio frequency energy. Prior to sealing, liquid electrolyte is added to the absorbent separator.

DESCRIPTION OF THE DRAWINGS

The cell, and its method of manufacture, will now be described in more detail in the following description of preferred embodiments, together with the accompanying drawings in which:

FIG. 1 is a cut-away perspective view of one embodiment of the invention;

FIG. 2 is a front elevational view in partial cross-section of the embodiment of FIG. 1;

FIG. 3 is a side elevational view in cross-section of the cell of FIG. 1;

FIG. 4 is a perspective view of another embodiment of the invention;

FIG. 5 is a cross-sectional view taken along the line 5—5 of FIG. 4;

DETAILED DESCRIPTION OF PREFERRED EMBODIMENTS

Figure 6:
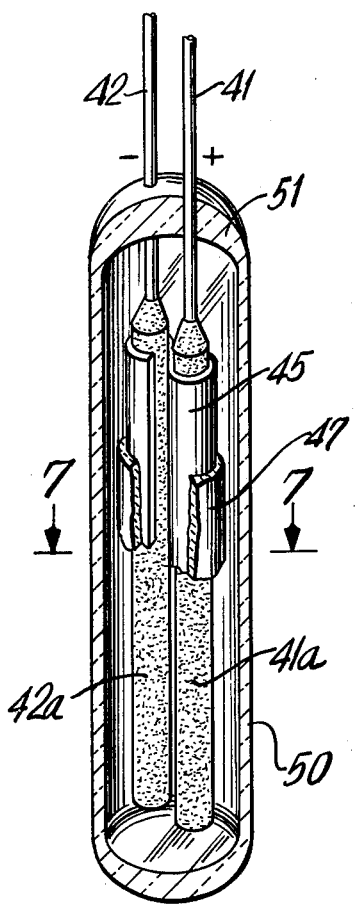
FIG. 6 is a cut-away perspective view of an alternate form of another embodiment of the invention.

FIG. 1 illustrates a preferred form of the invention. The cell includes an anode assembly, designated generally as 11, and a cathode assembly designated generally as 12. The anode is made up of individual plate electrodes 11a, 11b interleaved with the individual plate electrodes of the cathode 12a, 12b, 12c. Interposed between adjacent anode and cathode electrodes are separators 14 consisting of a fibrous, absorbent fabric such as "Pellon," nylon or other separator materials known to those in the art. Although, in FIG. 1, the cell is illustrated with two joined anode electrodes and three joined cathode electrodes, the number of electrodes (plates) and their surface areas as presented to the separators 14 will be selected in accordance with the particular requirements of the cell. It is preferable, however, that the amount of electrochemically active material associated with the cathode electrodes exceed that associated with the anode electrodes in order to preclude severe gassing of the cell in the event that the cell is driven into an excessive overcharge condition. In the cell of FIGS. 1–3, this is achieved by using an additional electrode plate in the cathode.

The invention is not limited to any particular type of active material or method of forming such electrodes. In the case of a rechargeable nickel-cadmium cell the active material (discharged state) is nickel hydroxide at the positive anode and cadmium hydroxide at the negative cathode.

The electrode plates 11a, 11b, 12a–12c are comprised of a thin metal substrate, e.g., nickel-plated steel, having a sintered porous plaque coating on both major surfaces of the substrate. The regions at the terminal ends of the respective electrodes, designated as 11c and 12d, are free of porous plaque and active material to facilitate welding. As illustrated in FIG. 1, the terminal ends of the anode electrodes 11a, 11b are welded together and to the terminal conductor 16, forming a positive connection from the interior of the cell to the exterior. Similarly, at the cathode 12, the terminal ends of the cathode plates 12a–12c are welded together and to the cathode terminal conductor 17, which extends from the interior to the exterior of the cell. Since the anode and cathode electrode plates are not rigidly secured, a certain amount of relative axial (longitudinal) movement is permitted, thus allowing for expansion and contraction under thermal changes or during assembly.

The entire electrode assembly is encased and hermetically sealed inside a glass casing 20, shown in cross-section in FIGS. 1 to 3. The terminal conductors 16, 17 are formed from a material (e.g., "Kovar" or "Glasseal 52" wire) which can be bonded to the glass casing 20, the glass being a borosilicate glass, for example. While alumina and quarts glasses are more corrosion-resistant, they have a higher melting point and are more difficult to fuse to the wire electrode leads. Moreover, the sealing wire required is not compatible with the electrolyte. Soda lime glass is also more resistant and is easy to fuse but its matching sealing wire is also not compatible. Moreover at aqueous solution electrolyte concentrations of, for example, 30%, KOH, the corrosive effects on glass are not more severe than at much lower concentrations, e.g., 5%. Finally, by limiting the amount of electrolyte solution on the glass walls, any slight wetting of the walls by the caustic electrolyte causes "passivation" of the glass so that corrosion products at the caustic-glass interface are less corrosive than the caustic itself.

Prior to sealing, an electrolytic liquid, e.g., KoH, is added to the absorbent separators 14 in an amount to ensure that all of the electrolyte is contained in the separators 14 and to preclude the presence of free electrolyte inside the casing 20. Since the electrolyte is caustic and, in a strong enough solution, can attack the glass, care should be taken to maintain the amount of electrolyte at a level below the saturation point for the separators. To the end of precluding direct contact of the edges of the separators 14 with the glass casing, an electrolyte-impervious wrapper may be used about the electrode assembly, as shown at 21 in FIG. 1.

One method of preparing the individual electrodes used in the anode and cathode of the cell is described in U.S. Pat. No. 4,029,856, assigned to the assignee of the present invention. As described in that patent, the electrodes are formed by providing a nickel-plated steel substrate having an array of perforations and undulations as well, if desired) in the areas which are to be covered with plaque in the finished plate. The substrate is then coated on both major surfaces with a slurry comprised of a nickel metal powder in a viscous gel carrier or organic binder. The slurry is applied by conventional methods such as by calendaring, following which the coated substrate is passed through a doctor-blade station in order to form slurry-free areas running longitudinally of the strip. In the finished electrode, these slurry-free regions will be located at the terminal edges of the electrodes, shown at 11c, 12d. After the nickel slurry has been applied, the coated substrate is passed through a sintering furnace which transforms the slurry into a sintered porous plaque of nickel powder.

Following sintering, the plates are impregnated by any of a number of known methods, as by immersing them into a bath of salt of the active material, removing the plate from the salt bath, drying it, immersing it into a solution for precipitating the active material in the form of hydroxide, and removing the plate from the solution and drying it and repeating this sequence until the plate has the desired capacity. Ordinarily, this series of steps is repeated approximately six times in order to impregnate a sufficient amount of active material. These plates are then severed by cutting them along a line dividing the slurry-free region. The negative electrode, containing the cadmium hydroxide material, may comprise a "pasted" plate made in accordance with the teachings of U.S. Pat. Nos. 3,877,986 and 3,870,562.

The cells disclosed herein are easily adapted to mass manufacturing techniques wherein the glass casing is initially formed of cylindrical glass tubing open at both ends. After the anode and cathode electrodes have been fabricated, but conveniently before they are welded to the cell terminal conductors 16, 17, as described above, the separators 14 are laid into place between adjacent anode and cathode electrodes. Preferably, the assembled anode-cathode structure, with separators in place, is wrapped with an elastic material or inert adhesive strip in order to bring all parts of the electrode assembly into intimate contact.

The entire electrode assembly is then inserted into the glass tubing, together with the electrolyte barrier wrapping 21 and held in its desired axial position inside the casing while the tube ends are fused about the terminal conductors 16, 17. Fusing may be accomplished by direct heating under flame, as by passing the tubing ends past high temperature gas jets on a production line, or by other localized heating techniques.

In the embodiment shown in FIGS. 4 and 5, an alternate form of electrode construction is employed. Here, both terminal conductors 25, 26 are brought out through the glass casing 28 at a common end. This means that the glass casing tube can be sealed at the lower end prior to insertion of the electrode assembly. In this case, the electrode assembly is formed of two essentially flat plates 31, 32, which may be of the foraminous coating or pasted type, as described above in connection with FIGS. 1–3. Electrodes may be made by depositing a nickel slurry onto the nickel substrate, as already described, and the terminal conductors welded onto the coating-free end of plate. Another method of forming the electrodes is to flatten the terminal conductor wire in a rolling mill so as to provide an expanded thin metal strip 29 (FIG. 5) and then treat this flattened portion of the wire with the slurry and sinter it in the manner previously explained. The separators in the cell of FIGS. 4–5 are comprised of electrolyte-absorbent sleeves 34 slipped or wrapped around the electrodes. The electrodes are then bound together by an electrolyte impervious wrapper or sleeve 36, or by other means (not shown) to maintain the electrodes and separators in intimate contact.

The separators in the embodiments of FIGS. 4–5 are shown as completely surrounding the electrodes; however, the separators might also be located only in the space between electrodes and, of course, the electrodes can be treated with active material on only one side, if desired.

Figure 7:
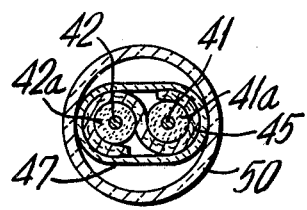
FIG. 7 is a cross-sectional view taken along line 7—7 of FIG. 6.

Another form of electrodes is illustrated in FIGS. 6–7. Here, each electrode is integral with its terminal conductor 41, 42. (While in the drawings the conductors have been indicated as being either positive or negative in polarity, this designation is arbitrary since the only difference between the electrodes is the makeup of the active material impregnated into the porous coating.)

The electrodes can be formed as follows: a Kovar wire is dipped into a nickel slurry containing a binder and then heated to a temperature sufficient to rigidify the coating and bond it to the wire. Successive coatings may be applied by using either a complete or intermediate heating step between coatings. These successive coatings form a cylindrical coating 41a, 42a on the terminal conductors 41, 42 and, after impregnation, the electrodes are ready for assembly.

A sheet of separator material 45 is wrapped around the adjacent electrodes as shown in FIG. 7 and in the cut-away representation in FIG. 6. The positive and negative electrodes and the separator 45 are held in intimate contact by a wrapping 47 (shown cut away in FIG. 6 and in full cross-section in FIG. 7). This wrapping may be polypropylene or some other electrolyte impervious flexible sheet material which has sufficient structural integrity so as to bind the electrode assembly together. Once the sheet material has been wrapped about the separator, it may be held in place by taping or elastic means (neither shown). The electrode assembly is then ready for insertion into the glass casing 50. Following electrolyte loading of the separator, the glass casing is sealed at its upper end 51 to the terminal conductors 41, 42 in the manner previously described.

A typical cell of the construction shown in FIGS. 6 and 7 may be 0.1 inches in diameter and 0.75 inches long. In one cell, similar in construction to that described in FIGS. 6 and 7, the glass casing comprised 0.050" wall borosilicate glass tubing, and the seals were established using the techniques common in the high production manufacture of miniature lamp bulbs. Specifically, such techniques employ a flanged glass collar which slips into the end of the glas tubing, with the flange abutting the tubing end. The narrower collar portion protrudes into the tube, with the leads extending through an opening in the collar. This enables the collar portion to be sealed to the electrode leads with a high temperature fuse. The electrolyte is next added, and the flange is then sealed to the tube end by a low temperature fuse.

Figure 8:
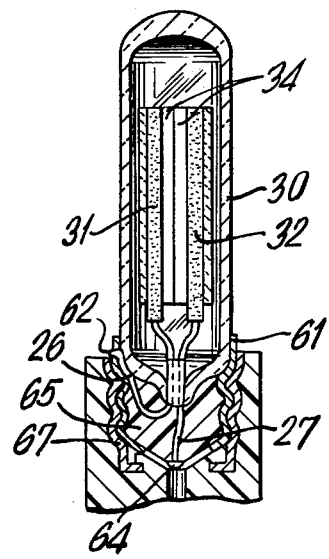
FIG. 8 is an elevational view in cross section of a galvanic cell in accordance with the invention, in combination with an electrical socket for receiving the cell.

Turning now to FIG. 8, a hermetically sealed glass enclosed galvanic cell of the type shown in FIGS. 4-5 is provided with a screw-type conductive base 61 wherein terminal lead 26 is soldered, as indicated at 62, to the screw base. The lead 27 is brought out to the central portion of the base and terminated in a soldered tip 64, with the glass casing 30, leads 26, 27 and screw-base 61 being held in place by an epoxy or other resinous material that fill the void between the glass casing and base 61. For purpose of illustration, the cell is shown in association with a screw-base socket 67; however, any number of other terminal bases can be applied to the cell, such as bayonet bases, friction fit bases and the like, all of which can be standard miniature lamp bases.

Figure 9:
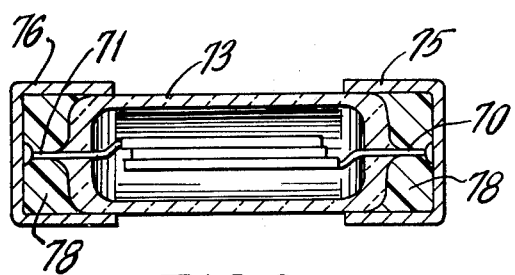
FIG. 9 is a similar cross-sectional view showing the cell in combination with conductive end sheaths connected to the cell terminals.

In FIG. 9, a representative cell is shown with terminal leads brought out to opposite ends of the cylindrical glass casing 73. A metallic cap, or sheath 75, 76 at a respective end of the cell, is joined electrically to an end terminal 70, 71 by soldering or welding. Again a resinous or ceramic potting compound 78 fills the voids between the casing and end caps to bind together these components. The construction of the cell in FIG. 9 is seen to resemble small-current type fuses and is readily adapted for plug-in application into fuse holders, or other similar receptacles.

A distinct advantage of the glass encased cells according to the invention is their versatility. They are inexpensive to manufacture and can be used in association with a number of standard-type terminal fixtures or bases, and their flexible leads can be soldered directly to printed circuit boards in the same manner as other types of discrete electronic components. Moreover, they are rechargeable in the same manner as other rechargeable cells which are now almost universally encased in metallic containers. They are well adapted to a variety of electrode constructions, but those of rectangular cross-section described above minimize the area of contact of the electrode assembly with the glass and offer little possibility of glass corrosion.

While the invention has been described with reference to specific embodiments, the invention is not limited to those embodiments. For example, yet other forms of electrode construction now found in rechargeable cells wherein the anode and cathode, interleaved with separator fabrics, are wound into a spiral. Such electrode constructions are disclosed in U.S. Pat. No. 3,790,408, assigned to the assignee of the present invention. Terminal connections to the type of spiral construction are made by welding terminal strips onto the projecting edges of the electrode plates. Additionally, although the glass casing is preferably cylindrical in cross-section in order to withstand higher internal gas pressures, other shapes might be used where only lower internal pressures are to be encounterd. To that end, glass casing might be elliptical or oval in shape so as to conform generally to the outside geometry of the electrode construction, thereby providing improved mechanican integrity to the cell.

What I claim is:

1. In a sealed electrochemical storage cell, having at least one anode electrode containing electrochemically active material, at least one cathode electrode containing electrochemically active material, and a porous electrolyte absorbent separator disposed between and in contact with each of said electrodes having an electrolyte absorbed therein, the improvement comprising:
a glass enclosure surrounding said electrodes and separator and hermetically sealing the cell;
a battery terminal conductor connected to each said anode and cathode and extending through said glass casing from the interior to the exterior thereof, said terminal conductor being bonded directly to said casing in sealing relationship therewith;
the amount of said electrolyte not exceeding the capacity of said separator thereby substantially to preclude the presence of free liquid electrolyte in the cell.

2. The electrochemical cell of claim 1, wherein:
said cathode presents an electrochemically active surface area which is greater than the electrochemically active surface area of said anode.

3. The electrochemical cell of claim 1, wherein:
at least one of said anode and cathode electrodes is cylindrical in shape.

4. The electrochemical cell of claim 3, wherein:
said cylindrical electrode comprises a rigid foraminous coating carried by the terminal conductor associated therewith, said coating being impregnated with electrochemically active material.

5. The electrochemical cell of claim 4, wherein:
said separator is wrapped about said cylindrical electrode.

6. The electrochemical cell of claim 1, wherein:
said anode and cathode comprises an interleaved structure of alternating anode and cathode electrode plates each being in contact with said separator.

7. The electrochemical cell of claim 6, wherein:
the respective electrode plates of said anode and said cathode are mechanically joined to each other and to the terminal conductor at one end of said plates.

8. The electrochemical cell of claim 7, wherein:
said terminal conductors extend through opposite ends of said glass casing.

9. The electrochemical cell of claim 1, wherein:
at least one of said anode and cathode electrodes comprises a flattened portion of said terminal conductor, said flattened portion having a rigid foraminous coating impregnated with said electrochemically active material.

10. The electrochemical cell of claim 9 wherein:
the separator comprises a sleeve surrounding at least one of said electrodes.

11. In combination with the cell defined in claim 1:
a socket having positive and negative contact points; and
terminal means carried by said glass casing and adapted to be received by said socket, said terminal means being electrically connected to said terminal conductors at one end of said casing so as to provide positive and negative terminal points mating with the positive and negative contact points of the socket.

12. In combination with the cell defined in claim 1:
a conductive sheath disposed about said glass casing at one end thereof, said sheath being electrically connected to at least one of said terminal conductors and adapted to be received by socket means.

13. The electrochemical cell of claim 1, further comprising:
an electrolyte impervious wrapper disposed between the glass envelope and the exposed portions of the separator so as to preclude direct contact of the electrolyte-laden separator with the glass envelope.

14. The electrochemical cell of claim 1, further comprising:
means binding the anode, cathode and separator so as to maintain them in intimate physical contact inside the glass enclosure.

15. The electrochemical cell of claim 1, wherein:
the glass casing is cylindrical in form, said casing being sealed to said terminal conductors at at least one end of said casing.

* * * * *